United States Patent [19]

Blau

[11] Patent Number: 5,393,973
[45] Date of Patent: Feb. 28, 1995

[54] OPTICAL SENSING ARRAYS EMPLOYING MISALIGNED SQUINTED OPTICAL AXES COMPARED TO ALIGNED AXES

[75] Inventor: David Blau, Cupertino, Calif.

[73] Assignee: Scientific Technologies Incorporated, Hayward, Calif.

[21] Appl. No.: 168,717

[22] Filed: Dec. 16, 1993

[51] Int. Cl.⁶ .................. G01V 9/04; G06M 7/00; H01J 40/14

[52] U.S. Cl. .................... 250/221; 250/222.1; 340/556

[58] Field of Search ............. 250/221, 222.1; 340/555, 556, 557

[56] References Cited

U.S. PATENT DOCUMENTS

| | | | |
|---|---|---|---|
| 3,746,863 | 7/1973 | Pronovost | 250/208 |
| 4,198,623 | 4/1980 | Misek et al. | 340/365 P |
| 4,266,124 | 5/1981 | Weber | 250/221 |
| 4,742,337 | 5/1988 | Haag | 340/556 |
| 5,015,840 | 5/1991 | Blau | 250/221 |
| 5,243,183 | 9/1993 | Barron, Jr. et al. | 250/222.1 |
| 5,266,793 | 11/1993 | Smith | 250/214 A |

Primary Examiner—David C. Nelms
Assistant Examiner—Steven L. Nichols
Attorney, Agent, or Firm—Flehr, Hohbach, Test, Albritton & Herbert

[57] ABSTRACT

An optical sensing array and method of operation for controlling the acceptance angle of light beams which are iteratively strobed in side-by-side channels between light transmitters and light receivers. The light beams in at least a pair of channels are directed along axes which are intentionally mispointed or squinted. A control circuit measures the amplitudes of signals produced responsive to light being received by the light receivers and compares the ratio of those amplitudes to the ratio of predetermined high and low amplitude values which provide a threshold window. When the ratio of the signal amplitudes exceeds the ratio of the window threshold values, an output signal is produced indicative of an unsafe operating condition. The control circuit further maintains the gain of the signals from the light receivers to stay within the range of the predetermined window threshold values.

24 Claims, 5 Drawing Sheets

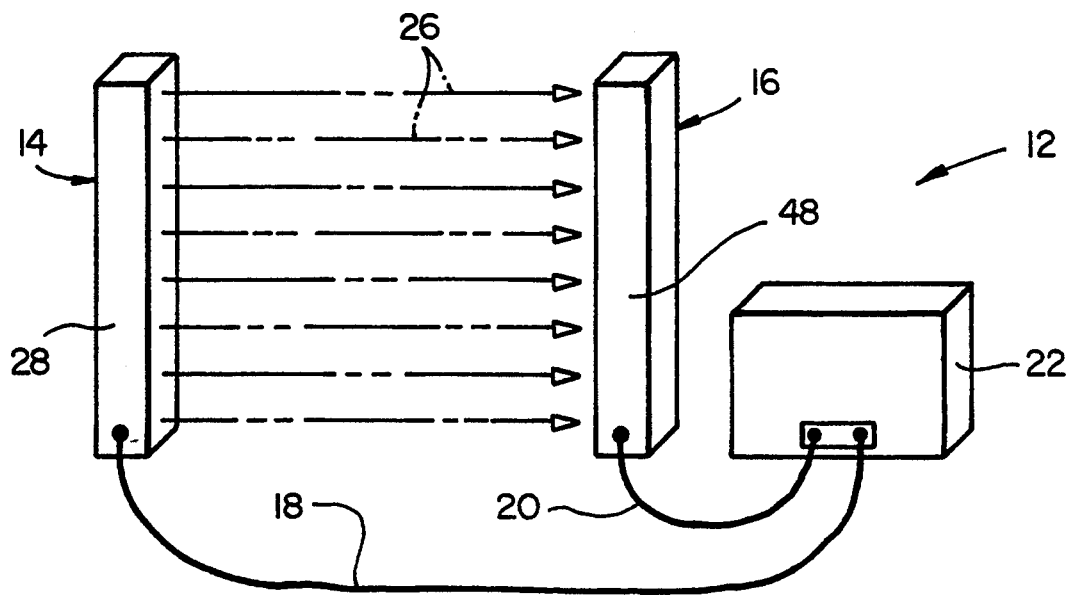
FIG_1
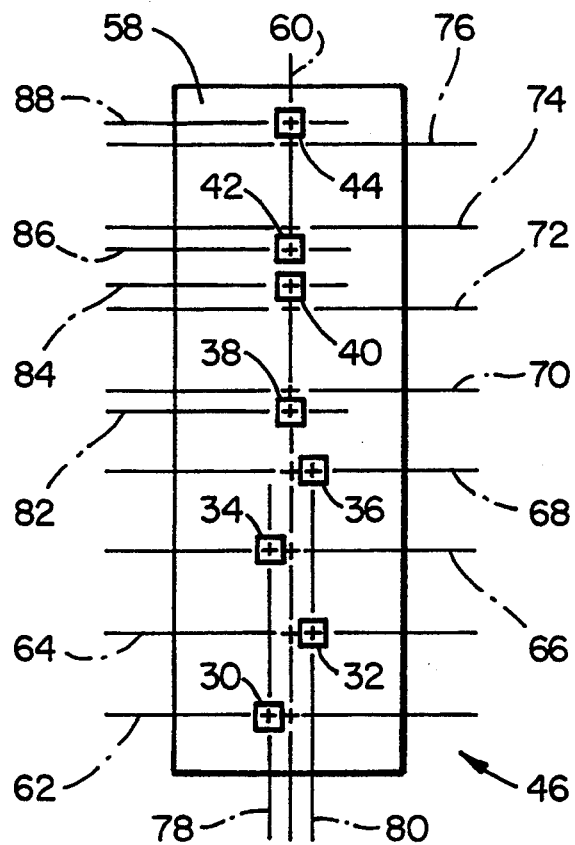
FIG_2

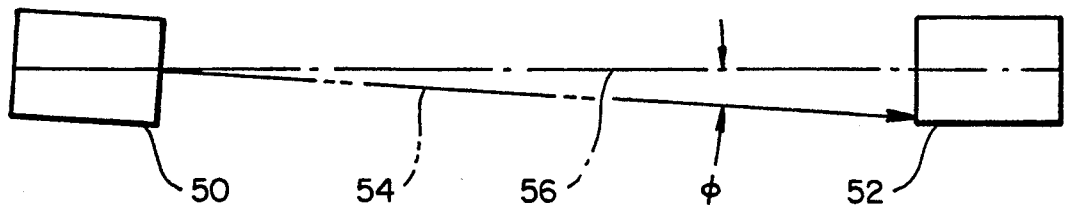
FIG_3
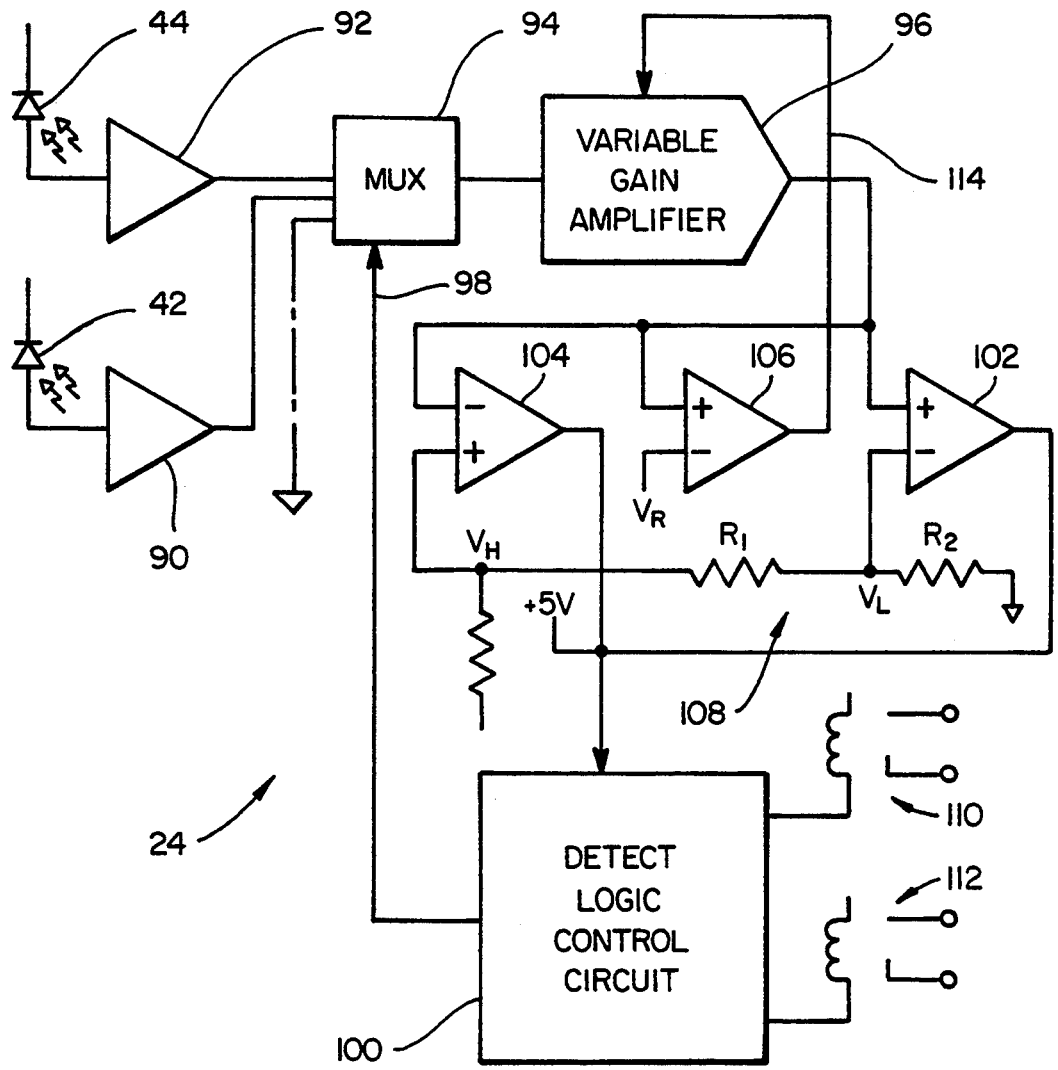
FIG_4

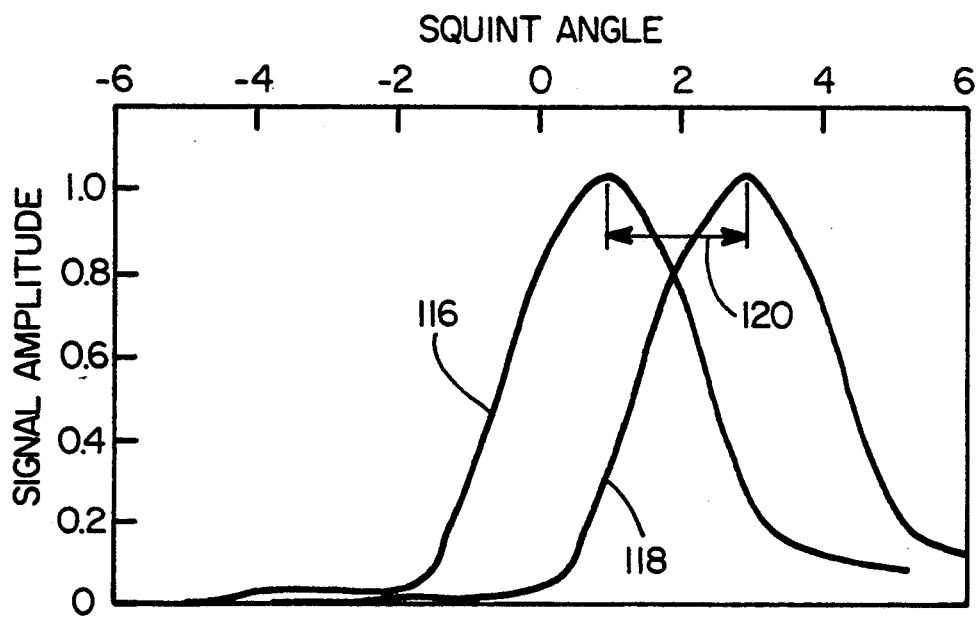
FIG_5
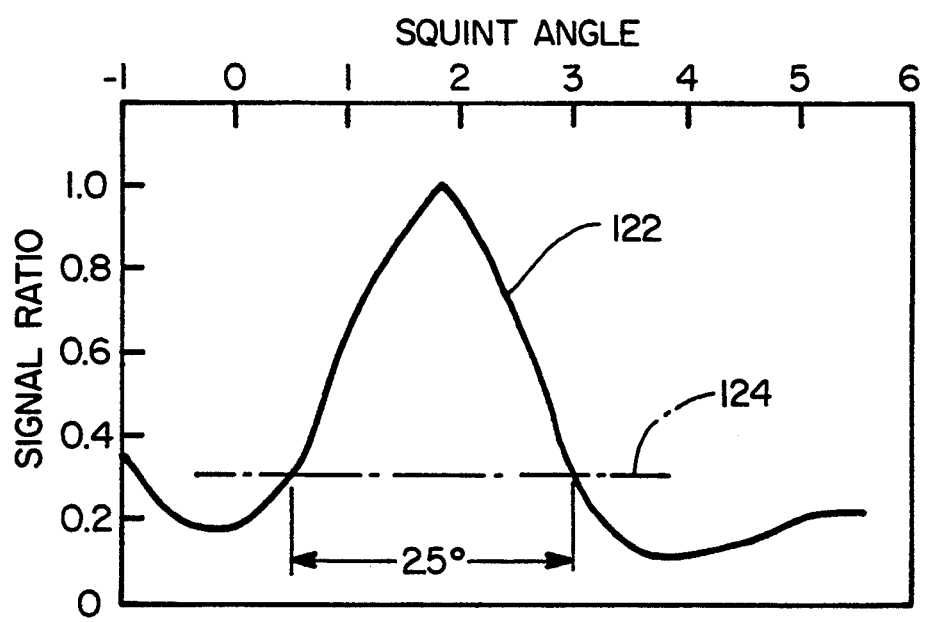
FIG_6

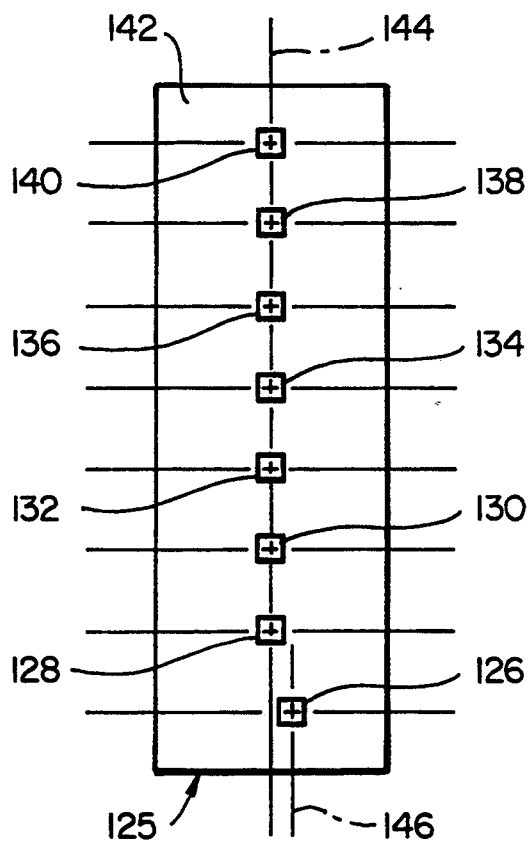
FIG_7
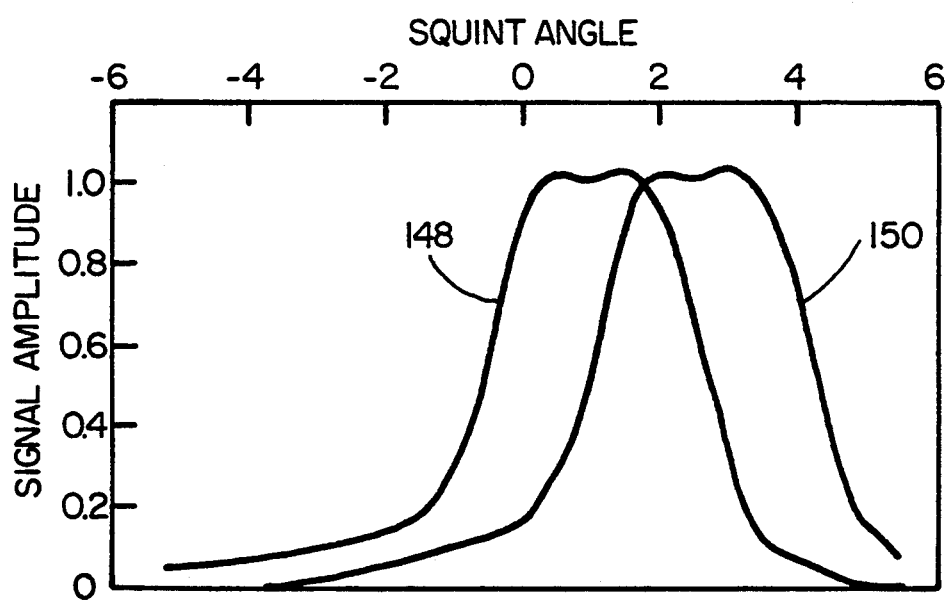
FIG_8

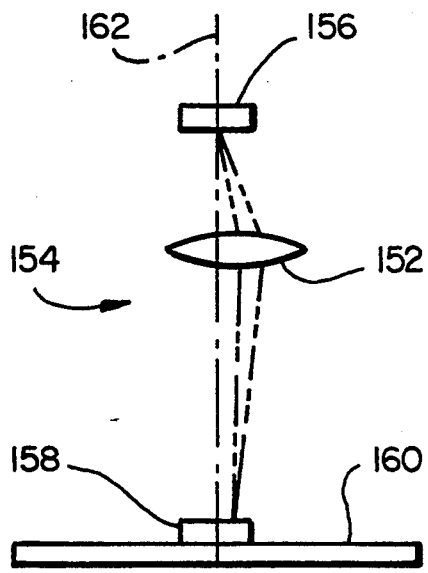
FIG_9
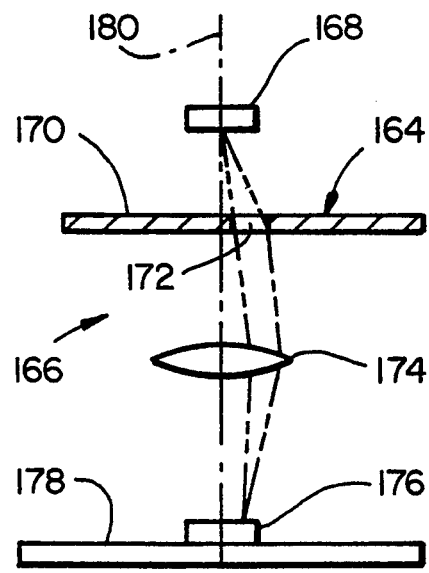
FIG_10
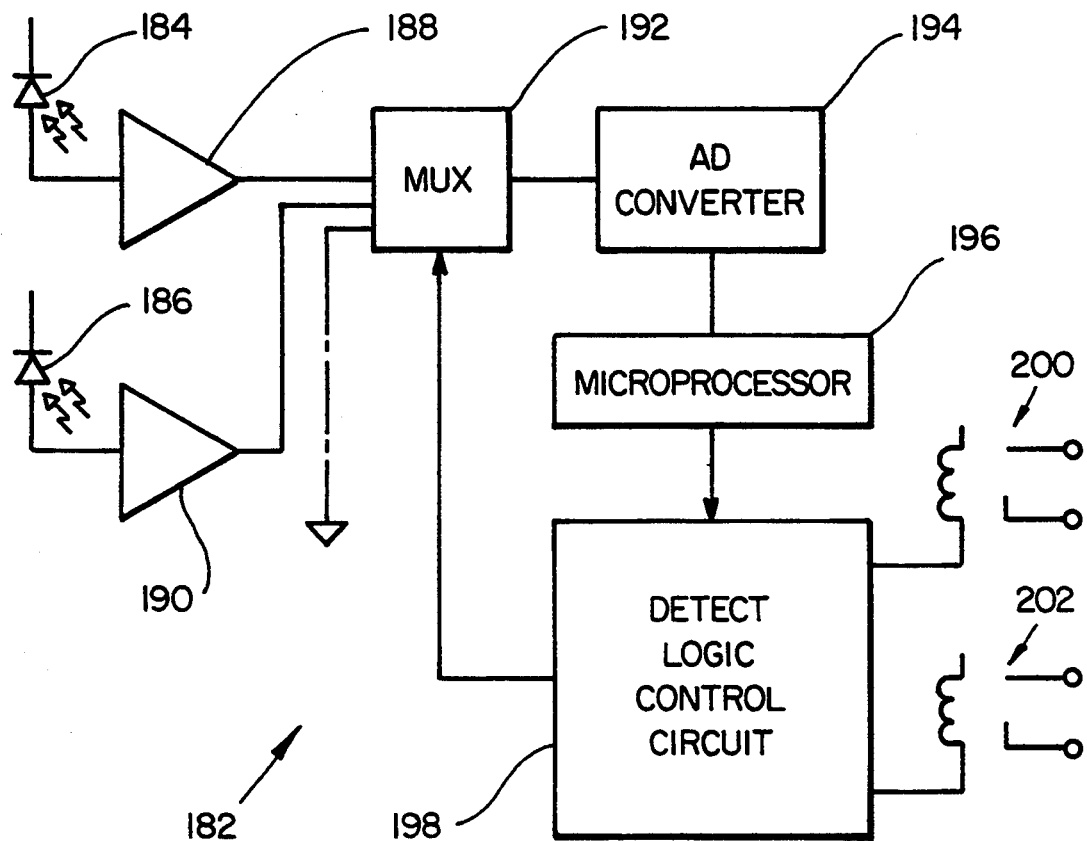
FIG_11

OPTICAL SENSING ARRAYS EMPLOYING MISALIGNED SQUINTED OPTICAL AXES COMPARED TO ALIGNED AXES

BACKGROUND OF THE INVENTION

1. Field of the Invention

This invention relates in general to optical sensing arrays for detecting the movement or intrusion of objects into guarded zones. More particularly the invention relates to optical sensing arrays such as light curtains of the type that provide protection for human operators who are working with machines and other industrial equipment.

2. Description of the Related Art

Optical sensing arrays such as light curtains employ infrared beams to provide operator safety in a variety of industrial applications. The optical sensing arrays typically are employed for operator protection around machinery such as punch presses, brakes, molding machines, automatic assembly equipment, coil winding machinery, robot operation, casting operations and the like. The systems employ light transmitters having light emitting diodes that are mounted at spaced positions along one side of the guard zone together with light receivers mounted at the opposite side of the zone. Modulated infrared light beams are strobed along separate parallel channels toward the light receivers. When the beams are blocked by penetration of an opaque object, such as the operator's arm, the control system shuts the machinery down, prevents the machine from cycling or otherwise safeguards the operator from injury, or the machine and/or work piece from damage.

In light curtains and other similar optical sensing arrays it is desirable to control the maximum angle of acceptance, which is the maximum angle between the transmitted light beam and the light receiver element at which the system can be expected to properly operate. Relatively large angles of acceptance are undesirable in light curtains because they make it more difficult for the control system to properly discriminate between signals from the light beams and signals from spurious or transient sources such as light reflections from the work piece or surrounding environment. Such conditions could cause the control system to detect the spurious light and produce a false signal that the light beams are unbroken when in fact objects are penetrating the guarded zone. This is a highly unsafe condition in that the light curtain system would then not properly shut down or safeguard the area when the person's arm or other object penetrates through the light beams.

Safety laws and regulations in many states and countries are in effect or have been proposed requiring that light curtain systems, before they can be certified for sale and use, meet certain minimum criteria for angle of acceptance accuracy. Typically the maximum allowed acceptance angles have been on the order of 4° full angle. Many countries in Europe now require that the angular accuracy for light curtains be no more than $2\frac{1}{2}°$, and Australia requires that the angular accuracy be no more than 2°.

In prior art light curtains the light beams are detected by light receivers, typically phototransistors (PT's) in a circuit which converts amplitude of the incident light beam into a voltage signal. With the light beam properly aligned on the optical axis of the PT, the detected signal is generally at its strongest. Misalignment of the light beam from that optical axis, such as from displacement of either the light transmitter or light receiver, causes a drop off in signal strength as a function of the misalignment angle. Where the light transmitter and receiver bars are maintained apart at a known distance then the displacement angle of the light beam from the PT's optical axis can be roughly measured as a function of signal strength. However, the absolute signal strength also varies as a function of the Square of the distance range between the transmitter and receiver. For example, when the range varies from one foot to 300 feet then the signal would vary over the range from about 100,000 to 1. Electronic control circuits relying upon absolute signal strength would not be able to discriminate between transmitter and receiver bars which are far apart and properly pointed, and those that are very close together and mispointed because the signal strength in both cases could be the same. This can lead to conditions in which the light curtain does not properly safeguard the area. For example, a light curtain in which the transmitter and receiver bars are mispointed beyond the maximum 4° limit but at close range could only have a signal attenuation of 1,000 to 1. Absolute signal strength is thus not a good measure of light beam angular accuracy.

In the prior art, one conventional arrangement for controlling angular accuracy of light beams is through the use of high quality optics utilizing collimating lenses to focus the beam with the LED in the focal plane of the lens system. However, it is difficult to maintain sharp edges on the beams because of built-in features associated with the LED's, such as bond wires and epoxy, variations in emissions across the face of the LED surface, dirt on the LED surface, focusing problems and the like. The problem is exacerbated when a large number, which can be on the order of one hundred twenty, of the LED's are mounted on a single transmitter bar. The result is that small angles of mispointing of the beam to the PT's optical axis gives relatively small signal attenuation. For example, at a mispointing angle of $2\frac{1}{2}°$ the attenuation is on the order of 30%. This is very small in relation to the 100,000 to 1 attenuation that can be expected where the distance between the transmitter and receiver bars can range from one to 300 feet. Therefore a circuit which uses the attenuation edge of the signal amplitude to determine beam angle is an unreliable method for controlling angular accuracy in light curtains.

The prior art systems employing high quality optics with large and precise lenses do not provide a satisfactory solution to the foregoing problem for a number of reasons. Any minor defects in the lenses produce softness on the edges of the light beams, which limits the use of signal attenuation for determining angular accuracy. The problem is exacerbated as a result of the trend in the industry to produce smaller light curtain products in which the transmitter and receiver elements are mounted close together such that the larger collimating lenses cannot be employed. In certain of these small size light curtains the dies of the PT's and LED's are mounted directly on the printed circuit (PC) boards of the light transmitter and receiver bars. In these arrangements any misalignment of the transmitter or receiver bars moves all of the respective PT's or LED's so that all would be misaligned, thereby compounding the problem of controlling angular accuracy.

The need has therefore been recognized for an optical sensing array and method of operation which can accurately control the acceptance angle of light beams and in which the control of angular accuracy can be maintained over a wide range of distance between the light transmitter and receiver elements. Despite the various types of optical sensing arrays in the prior art there has not yet been provided a suitable and attractive solution to these problems.

SUMMARY OF THE INVENTION

The present invention provides an optical sensing array system and method of operation for controlling the acceptance angle of light beams which are strobed from light transmitters across parallel channels toward light receivers. The axes of the light beams in at least a pair of channels in the array are squinted relative .to each other, and a control circuit compares the amplitudes of the signals from the light receivers associated with the pair of channels. An output signal is produced when the ratio of the amplitudes of the signals exceeds the ratio of predetermined high and low amplitude values. An autogain circuit controls the gain of the signals to remain within the range of the predetermined high and low amplitude values. Squinting of the light beams is provided in one embodiment by arranging at least one light transmitter element in offset relationship from the optical axis of the receiver element, in another embodiment by arranging at least one light receiver in offset relationship to the optical axis, in another embodiment by arranging beam-focusing lenses in offset positions, and in another embodiment by offsetting the apertures which form field stops for the beam-focusing lenses.

The foregoing and additional objects and features of the invention will appear from the following specification in which the several embodiments have been set forth in detail in conjunction with the accompanying drawings.

BRIEF DESCRIPTION OF THE DRAWINGS

FIG. 1 is a perspective view illustrating an optical sensing array in accordance with one embodiment of the invention.

FIG. 2 is a side elevation view of the light receiving bar for the sensing array shown in FIG. 1.

FIG. 3 is a schematic view, to an exaggerated scale, illustrating the intentional squinting of a light beam angle relative to the light receiver for the optical sensing array shown in FIG. 1.

FIG. 4 is a schematic diagram for the control circuit used in the optical sensing array of FIG. 1.

FIG. 5 is a graph illustrating the signal amplitude, measured by the control circuit of FIG. 5, as a function of squint angle for the light beams in a pair of the channels.

FIG. 6 is a graph illustrating the ratio of the high to low amplitudes as a function of squint angle for the two channels depicted in FIG. 5.

FIG. 7 is a side elevation view of a light transmitter bar in an optical sensing array according to another embodiment of the invention.

FIG. 8 is a graph similar to FIG. 5 showing light single amplitudes as a function of squint angle for another embodiment in which the transmitter elements are squinted.

FIG. 9 is a schematic diagram illustrating a lens arrangement for providing intentional squinting of the light beam angles according to another embodiment.

FIG. 10 is a schematic diagram illustrating an aperture arrangement which forms field stops for providing intentional squinting of the light beam angles in accordance with another embodiment.

FIG. 11 is a circuit diagram for a control system according to another embodiment of the invention.

DESCRIPTION OF THE PREFERRED EMBODIMENTS

In the drawings FIG. 1 illustrates generally at 12 an optical sensing array incorporating one embodiment of the invention. The optical sensing array provides a light curtain which includes a light transmitter 14 and light receiver 16. The transmitter and receiver are connected through cables 18, 20 to a control box 22 which contains components of the control circuit 24 shown schematically in FIG. 4.

Light transmitter 14 is comprised of a plurality of light sources, preferably LED's, not shown, which emit modulated, invisible pulses of infrared light beams 26 responsive to the control circuit. In the illustrated embodiment the light beams are shown as being strobed in eight separate channels, although the number of channels in an end-use application would depend on the particular requirements and specifications. The LED's are mounted in spaced-apart relationship along a transmitter bar, not shown, which is fitted within a transmitter housing 28. The spacing or pitch between the LED's is predetermined and defines the space between the parallel channels along which the beams are directed toward the light receiver. The area encompassed by the beams defines the protected or guarded zone. The LED's are focused by suitable collimating lenses, not shown, into relatively narrow beams to minimize the effects of light scattering.

Light receiver 16 is comprised of a plurality, shown as eight, of light sensing elements 30-44 (FIG. 2). The light sensing elements comprise phototransistors (PT's), which are mounted in spaced-apart relationship along a receiver bar 46 which is fitted within a receiver housing 48. Preferably the number of light receiving PT's is equal to the number of light transmitting LED's, which each PT associated with the LED of a respective channel. At the work place the transmitter and receiver housings are installed so that the light curtain created by the light beams is between the machine or other equipment and the human operator or the like which is to be protected. Typically the transmitter and receiver housings are mounted upright in a vertical plane between the machine and operator, although other configurations could be employed, depending upon the requirements and conditions of a particular application.

While the operation of the embodiments of this invention will be described as incorporating infrared light, it is understood that the invention also contemplates the use of other radiant energy for the beams, for example near-infrared. It is also understood that the invention contemplates that a plurality of the transmitter/receiver pairs may be combined in tandem to protect a relatively larger zone or area.

The light strobing and pulse detection logic functions are controlled in each scanning cycle to sequentially strobe light beams in side-by-side channels with the scanning cycles iteratively repeated. The scanning logic control preferably comprises the multiplexer 94 (FIG. 4) which can be operated through a control circuit of the type shown in U.S. Pat. No. 4,266,124 to Weber. The scanning logic control could alternately be comprised of a shift register circuit of the type shown in U.S. Pat. No. 5,015,840 to Blau, assigned to Scientific Technologies Incorporated. The disclosures of the Weber and Blau patents are incorporated herein by this reference.

It is an important aspect of the invention that the light beam in at least one channel is directed toward the respective light receiver element along an axis which is squinted relative to the axis along which the light beam in at least one other channel is strobed. As shown in the schematic of FIG. 3, the beam strobed from transmitter element 50 toward receiver element 52 is directed along an axis 54 which is intentionally mispointed in offset relationship from the axis 56 of the beam that is strobed in at least one other channel in the array. The included angle between the beams 54 and 56 is squint angle $\phi$, that is exaggerated in FIG. 3 for purposes of explanation. As used herein, the phrases "squinting," "squinted" and "squint angle" are intended to broadly include any non-coincidence of the light beam axis with the optical axis of the light receiver in each channel. The squinting is achieved in the desired channel by either offsetting the incident light beam from the optical axis of the light receiver, or by offsetting the light receiver optical axis from the light beam. Thus the squint angle is provided in different embodiments of the invention by means of offsetting the transmitter elements, by offsetting the receiver elements, by offsetting the focusing lenses or by offsetting apertures which form field stops in the lens system. The light beam in only one channel could be offset from the remaining non-offset channels to establish squint relationship, although any number of the channels in the array could have their respective light beams squinted.

In the embodiment of FIGS. 1 and 2 the squint angle is provided by intentionally offsetting each of the light receiver PT's 30–44. Light receiver bar 46 is comprised of a printed circuit (PC) board 58 to which the PT dies are directly attached. Each PT die is generally a rectangular shape with dimensions of approximately 10 mils on each side. In the illustrated embodiment eight PT dies are incorporated on the PC board in spaced-apart relationship along the PC board's longitudinal centerline 60. The number of PT's on each board can vary in accordance with the requirements and specifications of a particular application. The points at which the optical axes of the light beams impinge on the PC board are represented by the intersections of the plurality of reference lines 62–76 with centerline 60.

The squint angles between the four lowermost PT's 30–36 relative to the optical axes of the light beams in their respective channels are achieved by offsetting these PT's in alternate directions laterally of longitudinal centerline 60. In the illustrated embodiment this offset distance is approximately 3 mils from either side of the centerline, which is shown exaggerated for clarity in FIG. 2. Thus, PT 30 is offset to the left, as viewed in FIG. 2, along an axis 78 which is 3 mils from centerline 60 while its next adjacent PT 32 is offset along an axis 80 which is 3 mils to the right of the centerline. PT 34 is similarly offset 3 mils to the left while its next adjacent PT 36 is offset 3 mils to the right.

The squint angle can also be achieved by offsetting the PT's in alternate up and down relationship from the optical axes, as shown by the upper group of PT's 38–44. Thus, PT 38 is offset along an axis 82 which is approximately 3 mils below, as viewed in the figure, optical axis 70 while the next adjacent PT 40 is offset along an axis 84 approximately 3 mils above optical axis 72. Similarly, PT 42 is offset along an axis 86 approximately 3 mils below optical axis 74 while the upper PT 44 is offset along an axis 88 approximately 3 mils above optical axis 76. The invention contemplates that other offset positions could be employed to provide the squint angles, for example the PT's or alternatively the LED's could be offset by being displaced to positions that are along an arc, e.g. 45°, between the longitudinal and transverse centerlines through the respective optical axis. The invention includes any combination of these offset relationships to provide the squint angles, for example, all of the PT or LED elements could be alternately offset left and right of centerline, or all could be alternately offset above and below the optical axes.

FIG. 4 illustrates schematically the control circuit 24 of the invention for controlling operation of the optical sensing array in the embodiment of FIGS. 1 and 2. The circuit 24 provides a window comparator function and an autogain control function. The autogain control ensures that the amplified signals from the PT's stay within range. In the diagram only one pair of adjacent PT's 42 and 44 and their associated circuit components are illustrated for purpose of clarity. The PT's respond to incident light of sufficient amplitude and produce signals, the gain of which is increased by preamplifiers 90 and 92 connected with each of the PT's. Signals from all of the preamplifiers are directed into a multiplexer 94 which produces an output signal into a variable gain amplifier 96 for each signal received from the preamplifiers. A control signal from a detect logic circuit 100 is input into the multiplexer at 98.

The multiplexer time-selects the channels for receiving the amplified PT output signals by scanning the channels in relation to the sequence in which the light transmitting LED's are activated. The gain of the multiplexer output is increased by variable gain amplifier 96, and the amplifier's output is directed into the positive input of a low detect comparator 102, the negative input of a high detect comparator 104 and the positive input of a regulator comparator 106. A predetermined voltage is applied to the negative input of comparator 106 to provide a reference signal $V_R$. The positive input of high detect comparator 104 is connected through a resistor divider circuit 108 with the negative input of the low detect comparator. Circuit 108 comprises resistors $R_1$ and $R_2$. The values of $R_1$ and $R_2$ are selected to establish a predetermined high amplitude $V_H$, which inputs into high detect comparator 104, and low amplitude value $V_L$, which inputs into low detect comparator 102. The ratio $V_H/V_L$ is equal to $$\frac{R_1 + R_2}{R_2}.$$

Assuming as an example that $R_1 = 10K$ ohm and $R_2 = 1K$ ohm then the ratio $V_H/V_L = 11/1$. The resistors $R_1$ and $R_2$ could be replaced, as desired, by potentiometers for selectively adjusting the high-to-low threshold ratio $V_H/V_L$.

The outputs from the high and low detect comparators are directed into a detect logic circuit 100 which in turn generates a "safe out" or "condition unsafe" output signal which opens the circuits to the desired output relays 110, 112. When the output relays are opened they operate to either shut the system down, generate visual and/or audible alarm signals, or otherwise safeguard the protected area responsive to the control circuit.

Logic circuit 100 also generates the "safe out" output signal whenever it senses that the beams are blocked, such as from penetration of an opaque object.

As a part of the autogain control, the output of regulator comparator 106 is directed through feedback loop 114 to set the gain of variable gain amplifier 96. The autogain control maintains the maximum amplitude of the signals around the $V_R$ level. The circuit examines the amplitudes of $V_1, V_2 \ldots V_x$ of the signals after they are detected by the PT's in all of the channels and amplified during each cycle. If any of the amplitudes $V_1, V_2 \ldots V_x$ are above $V_R$, then the signal from comparator 106 through loop 114 incrementally downranges the gain of amplifier 96 by a predetermined amount, such as 0.3 dB. If all of the amplitudes in the channels are below $V_R$ in any one scanning cycle, then the gain from amplifier 96 is incrementally upranged by a predetermined amount, such as 0.3 dB. By this means the highest channel signal hovers around $V_R$. Preferably $V_R$ is selected at a small value, such as 0.6 dB, below $V_H$. This circuit arrangement guarantees that, no matter how strong or weak the signals from the PT's are, the ratio $V_1/V_2$ of the strongest to the weakest channel amplitudes will never exceed $V_H/V_L$, otherwise the detect logic circuit operates to open relays 110, 112 for indicating an unsafe condition of the light curtain. Differing signal strengths, such as those caused by changes in transmitter-to-receiver distances, are nulled out of the circuit operation by the variable gain amplifier. In a typical light curtain operation the predetermined values can be set so that $V_H=10V$, $V_L=1V$ and $V_R=9.5V$.

The graph of FIG. 5 shows the effect of intentionally mispointing of the between the channels over a range of squint angles. Curve 116 plots the light amplitude signal in one channel as a function of squint angle while curve 118 plots the light amplitude for the signal in the other channel as a function of squint angle. In this example the beams for the two channels are mispointed so that the included angle between their axes, which is the predetermined squint angle, is approximately 2°, as shown by the distance 120 between their points of highest amplitude. With the axes of the light beams for these two channels arranged with this squint angle, the curves are offset so that one signal is larger than the other over the range of squint angles. Thus, the squint angles for all of the PT's would uniformly vary as the PT's are moved in unison, such as when the light receiver bar is tipped relative to the light beams. The squint angle at which the two curves cross is the angle at which the channel signals are the same, and at all other angles the signals from the two channels diverge in amplitude.

The amplitude ratio between the differently mispointed channels is measured and compared by components of circuit 24 that provide a window comparator function which enforces the maximum channel-to-channel gain ratio $V_H/V_L$ to output a "condition safe" signal from detect logic circuit 100. FIG. 6 graphs in curve 122 the signal ratio $V_1/V_2$ for the differently pointed channels represented by the amplitude signal curves of FIG. 5. As an example, with the window comparator function established so that the predetermined amplitude ratio $V_H/V_L=3/1$, represented by the line 124, then curve 122 shows that this channel ratio is exceeded when the squint angle is above about a 2.5° included angle. At this point the control circuit determines that the signal ratio $V_1/V_2 > V_H/V_L$ to produce the output signal through detect logic circuit 100 for operating relays 110 and 112. As a result, any mispointing of the light receiver bar beyond the minimum acceptable 2.5° angle is detected so that the output from the circuit represents a "condition unsafe" signal.

An important advantage of the invention is that by knowing the intentional squint angle, and by knowing the high and low window threshold $V_H/V_L$, then the angle over which the light curtain can be mispointed and still operate can be determined and controlled irrespective of the range between the transmitter and receiver bars. The control system of the invention can detect changes in mispointing of either the transmitter or receiver bars by measuring the amplitude ratio $V_1/V_2$ and does not depend upon measuring absolute signal level. If the measured ratio $V_1/V_2$ exceeds the predetermined ratio $V_H/V_L$, which can be selectively varied by changing the upper and lower thresholds, then it is possible to easily determine the maximum mispointed angle beyond which the light curtain will not operate. This makes it possible to construct and install a light curtain which will operate, with a high degree of certainty, within a predetermined squint angle, such as the $2\frac{1}{2}°$ maximum permissible angle specified by the laws of certain countries.

FIG. 7 illustrates another embodiment providing an alternate arrangement for producing the squint angle by means of a light transmitter bar 125 in which only one of the light transmitting elements or LED's is intentionally mispointed from the remaining LED's. A plurality of the LED's 126–140 are mounted on a PC board 142 which is fitted in the transmitter bar housing. The LED's are spaced apart along the longitudinal axis 144 of the transmitter bar with the LED 126 offset along an axis 146 from one side of axis 144 by a predetermined distance, e.g. 3 mils. With this configuration the axis of the light beam strobed by LED 126 is intercepted by the light receiver element, not shown, in the respective channel at a position which is offset from the optical axis of the LED's in the remaining channels. Other arrangements could be employed for mispointing the LED's to produce the desired squint angle, such as positioning the LED's in adjacent channels in alternate up and down relationship, along the length of longitudinal axes, from the optical axes of the respective PT's. A combination of alternate left and right or up and down displacement of the LED's relative to the PT optical axes could also be employed.

A control circuit similar to that explained in connection with FIG. 4 is provided for operating the optical sensing array employing the light transmitter bar of FIG. 7. The graph of FIG. 8 depicts curves 148, 150 which represent the respective signal amplitudes $V_1$ and $V_2$ as a function of squint angle between the beam from LED 126 and the optical axes of the remaining LED's. In this example the light transmitter LED's are positioned so that the full included angle of squint produced by this offset is substantially 2°.

FIG. 9 schematically illustrates another embodiment providing an alternate arrangement for producing the squint angle by offsetting the lens 152 in a beam focusing lens system 154. For each LED 156 in the light transmitter bar a lens 152 is mounted in the channel for focusing the strobed light beam toward a respective PT 158 which is mounted in receiver bar 160. The lenses in adjacent channels are offset in alternate directions a predetermined distance from the optical axis 162 between the LED's and PT's. This causes the center of the beam to intercept the plane of PT 158 at a predetermined offset distance from the axis 162. The predetermined offset distance can be on the order of 3 mils, and that offset is shown exaggerated in FIG. 9 for purpose of clarity. A control system similar to that explained in connection with FIG. 4 operates the optical sensing array employing the lens focusing system of FIG. 9.

FIG. 10 schematically illustrates another embodiment providing an alternate arrangement for producing the squint angle employing offset of the field stops 164 in a beam focusing system 166. LED's 168 in a light transmitter bar strobe light beams along parallel channels toward an opaque screen 170 which is formed with a plurality of apertures 172 (only one is shown), which are circular. Each aperture is associated with a respective light beam channel. On the opposite side of each aperture a lens 174 is mounted at a distance where the aperture forms the field stop for the lens. The image of LED 168, when it is strobing light, which appears in the aperture is focused by the lens and directed along an axis toward PT 176 for that channel in light receiver bar 178. The apertures for adjacent channels are offset alternately on opposite sides of the optical axis 180 extending through the centerline of the PT's. This offset of the apertures causes the focused beams to intercept the plane of the PT's at positions which are alternately offset from the optical axes of the PT's. As a result the focused beams produce the squint angle which is employed in operating the optical sensing array incorporating a control circuit similar to that described for FIG. 4. The invention also encompasses field stop apertures which are elongated (e.g. ellipses) in the direction of desired squinting. The elongated apertures will produce the squint effect in a manner similar to offsetting the circular apertures.

FIG. 11 illustrates another embodiment providing an alternate window comparator circuit for measuring the ratio $V_1/V_2$ and comparing it to the predetermined window threshold ratio $V_H/V_L$. The circuit 182 would be used in place of the circuitry which includes the variable gain amplifier and comparator circuitry in the control circuit of FIG. 4. Signals from the series of PT's 184, 186 in the light receiver bar are directed through preamplifiers 188, 190 and into multiplexer 192. The multiplexer time-selects the appropriate channel when the LED's are strobed in each scanning cycle. The signals are then directed into an AD converter 194. The converted digital signal is then directed into a microprocessor 196 of a conventional type which converts $V_1$ and $V_2$ into respective logarithmic values $Log_1$ and $Log_2$. The microprocessor is also controlled to establish predetermined logarithmic values $Log_H$ and $Log_L$ which respectively represent the upper and lower signal threshold levels. Microprocessor 196 is further programmed to compute the difference between the high and low channels $V_1$ and $V_2$ by computing the value $X = Log_1 - Log_2$. The microprocessor further computes the value $Y = Log_H - Log_L$, and the ratios are compared by measuring the difference between the values X and Y. When the microprocessor detects that $X > Y$, a control signal is input into detect logic circuit 198 which outputs a "condition unsafe" signal for operating the relays 200, 202 as in the embodiment of FIGS. 1–4.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method of operating an optical sensing array for controlling the acceptance angle of light beams which are iteratively strobed in cycles from a plurality of light transmitters in side-by-side channels toward a plurality of light receivers which are associated with respective channels and are adapted to sense the light beams for producing signals, the method comprising the steps of directing the light beam in a first one of the channels along a first axis which is squinted relative to a second axis along which the light beam in at least a second one of the channels is strobed, producing a signal $V_1$ responsive to light being sensed by the light receiver associated with the first channel, producing a signal $V_2$ responsive to light being sensed by the light receiver associated with the second channel, establishing a predetermined high amplitude value $V_H$, establishing a predetermined low amplitude value $V_L$ which is below $V_H$, comparing the ratio $V_1/V_2$ to a ratio $V_H/V_L$, and producing an output signal responsive to $V_1/V_2 > V_H/V_L$.

2. A method as in claim 1 including the steps of converting $V_1$ and $V_2$ into respective logarithmic values $Log_1$ and $Log_2$, converting $V_H$ and $V_L$ into respective logarithmic values $Log_H$ and $Log_L$, and the step of comparing the ratio $V_1/V_2$ to the ratio $V_H/V_L$ is carried out by determining the value $X = Log_1 - Log_2$ and the value $Y = Log_H - Log_L$ and by determining the difference between the values X and Y, and the step of producing the output signal is carried out responsive to $X > Y$.

3. A method as in claim 1 which includes holding one of the light transmitters associated with the first channel at one position which is offset a predetermined distance in a first direction from a given axis to cause the first axis to be squinted, and holding another of the light transmitters associated with the second channel at another position which is offset in a second direction from said given axis to cause the second axis to be squinted.

4. A method as in claim 1 which includes holding one of the light receivers associated with the first channel at one position which is offset from a given axis to cause the first axis to be squinted, and holding another of the light receivers associated with the second channel at another position which is offset from said given axis to cause the second axis to be squinted.

5. A method as in claim 1 which includes directing the light beams in each channel into optical lenses and focusing the light beams through the lenses into light paths, positioning the lens in the first channel at one position which is offset from a given axis and causing the light path in the first channel to be strobed along said squinted first axis and to be received by the light receiver associated with the first channel at an offset distance from the optical center of the light receiver, positioning the lens in the second channel at another position which is offset from said given axis and causing the light path in the second channel to be strobed along said squinted second axis and to be received by the light receiver associated with the second channel at an offset distance from the optical center of the light receiver.

6. A method as in claim 1 which includes directing the light beams through a substantially opaque screen having a plurality of apertures which form field stops for lenses which focus images of respective light beams onto the light receivers, positioning the aperture which forms the field stop associated with the light beam in the first channel at one position which is offset from a given axis sufficient to cause the light path in the first channel to be strobed along said squinted first axis and to be received by the light receiver associated with the first channel along a path which is squinted form the optical center of the light receiver, positioning the aperture which forms the field stop associated with the light beam in the second channel at another position which is offset from said given axis sufficient to cause the light path in the second channel to be strobed along said squinted second axis and to be received by the light receiver associated with the second channel along another path which is squinted from the optical center of the light receiver.

7. A method as in claim 1 which includes the step of controlling the gain of the signals $V_1$ and $V_2$ in the ranges $V_L < V_1 < V_H$ and $V_L < V_2 < V_H$.

8. A method as in claim 7 which includes the step of establishing a predetermined reference signal $V_R$ where $V_L < V_R < V_H$, and controlling the highest amplitude of the signals $V_1$ or $V_2 \approx V_R$.

9. A method as in claim 8 including the step of establishing $V_R$ in the range of substantially 0.4 dB to 0.8 dB below $V_H$.

10. A method as in claim 1 in which the optical sensing array is used for safeguarding operating machinery, including the step of stopping operation of the machinery responsive to said output signal.

11. A method as in claim 1 including the step of generating an alarm signal responsive to said output signal.

12. A method as in claim 1 including the step of generating another signal responsive to either $V_1 < V_L$ or $V_2 < V_L$ for indicating an unsafe condition of the optical sensing array.

13. An optical sensing array system as in claim 1 in which said first axis is coincident with the optical axis of the light receiving element associated with the first channel and the second axis is displaced laterally from the first axis.

14. An optical sensing array system for controlling the acceptance angle of light beams, the system comprising the combination of a light transmitter having a plurality of light transmitter elements, a light receiver having a plurality of light receiving elements which are arrayed across the optical sensing array from respective ones of the light transmitter elements, means for iteratively strobing light beams from the light transmitter elements in side-by-side channels toward the light receiver elements, beam squinting means for causing the light beam in a first one of the channels to be directed toward the respective light receiving element in the first channel along a first axis which is squinted relative to a second axis along which the light beam in at least a second one of the channels is strobed, means for producing a signal $V_1$ responsive to light being sensed by the light receiver element of the first channel, means for producing a signal $V_2$ responsive to light being sensed by the light receiver element of the second channel, means for establishing a predetermined high amplitude value $V_H$ and a predetermined low amplitude value $V_L$ which is below $V_H$, means for comparing the ratio $V_1/V_2$ to the ratio $V_H/V_L$, and means for producing an output signal responsive to $V_1/V_2 > V_H/V_L$.

15. An optical sensing array system as in claim 14 including means for converting the signals $V_1$ and $V_2$ into respective logarithmic values $Log_1$ and $Log_2$ and for converting $V_H$ and $V_L$ into respective logarithmic values $Log_H$ and $Log_L$, and said means for comparing the ratio $V_1/V_2$ to the ratio $V_H/V_L$ includes logic means for determining the value $X = Log_1 - Log_2$ and the value $Y = Log_H - Log_L$ and for determining a difference between X and Y, and said means for producing the output signal responds to said logic means determining that $X > Y$.

16. An optical sensing array system as in claim 14 in which said beam squinting means comprises positioning means for holding the light receiver element associated with the first channel at one position which is offset a predetermined distance in a first direction from an optical axis of the light receiving element to cause the first axis to be squinted, said positioning means further holding the light receiver element associated with the second channel at another position which is offset in a second direction from said optical axis to cause the second axis to be squinted.

17. An optical sensing array system as in claim 16 in which said positioning means holds the light receiver elements in spaced-apart relationship along a longitudinal centerline of the light receiver and further holds the adjacent light receiver elements, which are associated with said first and second channels, on opposite sides of said longitudinal centerline.

18. An optical sensing array system as in claim 14 in which said beam squinting means comprises positioning means for holding the light transmitter element associated with the first channel at one position which is offset a predetermined distance in a first direction from an axis of the light receiving element associated with the first channel to cause the first axis to be squinted, said positioning means further holding the light transmitter element associated with the second channel at another position which is offset in a second direction from said optical axis of the light receiving element associated with the second channel to cause the second axis to be squinted.

19. An optical sensing array system as in claim 18 in which said positioning means holds the light transmitter elements in a spaced-apart relationship along a longitudinal centerline of the light transmitter and further holds the adjacent light transmitter elements, which are associated with said first and second channels, on opposite sides of said longitudinal centerline.

20. An optical sensing array system as in claim 14 which includes lens means for focusing the light beams in the channels onto the light receivers, and said beam squinting means includes means for holding the lens means in the first channel at one position which is offset from the optical axis of the light receiving element associated with the second channel for causing the focused light beam in the first channel to be received by the respective light receiver along a squinted axis which is at an offset distance from the optical center of the light receiver, said beam squinting means further including means for holding the lens means in the second channel at another position which is offset from said given axis for causing the focused light beam in the second channel to be received by the light receiver along another squinted axis which is at an offset distance from the optical center of-the light receiver.

21. An optical sensing array system as in claim 14 in which said positioning means includes means for directing the light beams through a substantially opaque screen having apertures which form field stops for lenses which focus images of respective light beams onto the light receivers, said positioning means holding the aperture which forms the field stop associated with the light beam in the first channel at one position which is offset from the optical axis of the light receiving element associated with the first channel sufficient to cause the light path in the first channel to be received by the light receiver associated with the first channel along a path which is squinted from the optical center of the light receiver, said positioning means further holding the aperture which forms the field stop associated with the light beam in the second channel at another position which is offset from the optical axis which is associated with the second channel sufficient to cause the light path in the second channel to be received by the light receiver associated with the second channel along another path which is squinted from the optical center of the light receiver.

22. An optical sensing array system as in claim 14 which includes means for controlling the gain of the signals $V_1$ and $V_2$ in the ranges $V_L<V_1<V_H$ and $V_L<V_2<V_H$.

23. An optical sensing array system as in claim 22 which includes means for establishing a predetermined reference signal amplitude value $V_R$ having the relationship $V_L<V_R<V_H$, and means for controlling the amplitude of the highest signals $V_1$ or $V_2 \approx V_R$.

24. An optical sensing array system as in claim 14 which includes means for generating another signal responsive to either $V_1<V_L$ or $V_2<V_L$ for indicating an unsafe condition of the optical sensing array.

* * * * *